(12) United States Patent
Kwak et al.

(10) Patent No.: US 7,734,461 B2
(45) Date of Patent: Jun. 8, 2010

(54) APPARATUS FOR PROVIDING VOICE DIALOGUE SERVICE AND METHOD OF OPERATING THE SAME

(75) Inventors: Byung Kwan Kwak, Yongin (KR); Jeong Mi Cho, Suwon-si (KR); In Ho Kang, Yongin-si (KR)

(73) Assignee: Samsung Electronics Co., Ltd, Suwon (KR)

( * ) Notice: Subject to any disclaimer, the term of this patent is extended or adjusted under 35 U.S.C. 154(b) by 589 days.

(21) Appl. No.: 11/510,728

(22) Filed: Aug. 28, 2006

(65) Prior Publication Data
US 2007/0208556 A1    Sep. 6, 2007

(30) Foreign Application Priority Data
Mar. 3, 2006    (KR) .................... 10-2006-0020600

(51) Int. Cl.
*G06F 17/27* (2006.01)
(52) U.S. Cl. .................... 704/9; 704/257; 704/255
(58) Field of Classification Search .............. 704/1–10, 704/251, 257, 231, 255, 270, 270.1
See application file for complete search history.

(56) References Cited

U.S. PATENT DOCUMENTS

| | | | |
|---|---|---|---|
| 6,246,981 B1 | 6/2001 | Papineni et al. ............. 704/235 |
| 6,314,398 B1 * | 11/2001 | Junqua et al. ............... 704/257 |
| 6,598,018 B1 * | 7/2003 | Junqua ........................ 704/251 |
| 6,604,090 B1 | 8/2003 | Tackett et al. ................ 706/11 |
| 6,786,651 B2 | 9/2004 | Raj et al. ..................... 385/88 |
| 6,910,004 B2 * | 6/2005 | Tarbouriech et al. ........... 704/9 |
| 7,158,930 B2 * | 1/2007 | Pentheroudakis et al. ..... 704/10 |
| 2002/0133347 A1 | 9/2002 | Schoneburg et al. ........ 704/257 |

FOREIGN PATENT DOCUMENTS

| | | |
|---|---|---|
| JP | 4-158476 | 6/1992 |
| JP | 2001-209662 | 8/2001 |
| JP | 2002-251233 | 9/2002 |
| JP | 2002-351492 | 12/2002 |
| KR | 1999-0047859 | 7/1999 |

* cited by examiner

*Primary Examiner*—Huyen X. Vo

(57) ABSTRACT

A speech dialogue service apparatus including: a language analysis module tagging a part of speech (POS) of each respective word included in a sentence recorded in a predetermined text, syntactically analyzing the sentence by classifying a meaning of each respective word, and generating at least one semantic frame corresponding to the sentence according to a result of the syntactical analysis; and a dialogue management module analyzing an intention of the sentence corresponding to the at least one respective semantic frame, and generating a system response corresponding to the sentence intention by selecting a predetermined sentence intention according to whether an action corresponding to the intention of the respective sentence can be performed.

9 Claims, 6 Drawing Sheets

| ARGUMENT NAME | ID | ARGUMENT TYPE | UTTERED VALUE | RESOLVED VALUE | DEFAULT VALUE | OBLIGATORY |
|---|---|---|---|---|---|---|
| TARGET | 1 | TARGET_T | N/A | " " → "TV#1" | "TV#1" | NO |
| ABSOLUTE-CHANNEL | 2 | ABSOLUTE-CHANNEL_T | MBC | "MBC" → "11" | "MBC" | YES |

SBS ↔ 6
KBS1 ↔ 9
MBC ↔ 11

FIG. 5

| ARGUMENT NAME | ID | ARGUMENT TYPE | UTTERED VALUE | RESOLVED VALUE | DEFAULT VALUE | OBLIGATORY |
|---|---|---|---|---|---|---|
| TARGET | 1 | TARGET_T | N/A | | | YES |
| ABSOLUTE-CHANNEL | 2 | ABSOLUTE-CHANNEL_T | "FRIENDS" | | | YES |
| START-TIME | 3 | TIME_T | "FRIENDS" | | | YES |
| END-TIME | 4 | TIME_T | "FRIENDS" | | | YES |

RESOLUTION FAILED → SUB-DIALOGUE MODE

"FRIENDS" → "11"
"FRIENDS" → "MONDAY 10:00~11:00"

PROGRAM_NAME → ABSOLUTE_CHANNEL
PROGRAM_NAME → START_TIME
PROGRAM_NAME → END_TIME

FIG. 6

APPARATUS FOR PROVIDING VOICE DIALOGUE SERVICE AND METHOD OF OPERATING THE SAME

CROSS-REFERENCE TO RELATED APPLICATION

This application claims priority from Korean Patent Application No. 10-2006-0020600, filed on Mar. 3, 2006, in the Korean Intellectual Property Office, the disclosure of which is incorporated herein by reference.

BACKGROUND OF THE INVENTION

1. Field of the Invention

The present invention relates to a speech dialogue service apparatus and method, and more particularly, to a speech dialogue service apparatus and method of analyzing a dialogue style sentence including a natural language uttered by a user, analogizing omitted information of the sentence via dynamic context management, and analyzing and performing an intention of the user, thereby precisely analyzing and performing an uttered content of the user even when the user utters in the natural language as an ordinary dialogue instead of uttering only in a certain type of dialog capable of being recognized by a system.

2. Description of Related Art

Currently, technologies relating to home networks have been rapidly developing. Via home networks, home electronics such as a television, a video tape recorder, a telephone, a washer, and a refrigerator are connected to each other and users may enjoy various benefits by such network connections of home electronics.

In conventional technologies, to control home electronics by home networks, users must know a command system corresponding to each home electronics device or know the corresponding command system to interact with home electronics device. For example, users may directly control home electronics by using a remote control or a portable device.

However, as the so-called "Ubiquitous era" comes of age, methods of directly controlling home electronics by users as described above are being gradually substituted by methods in which home electronics are controlled by recognizing contents of dialogue uttered by users and executing corresponding operations.

Methods of controlling dialogue type home electronics include, speech recognition technology for receiving and converting a speech of users into a text and a technology for applying a dialogue type order analyzed by speech recognition to home electronics connected via home networks.

However, according to the described conventional method of controlling home electronics by speech recognition, there is a restriction on utterance contents of users. Specifically, users are must utter just a few instructions capable of being recognized by a home electronics control system to control home electronics. Accordingly, users must know well the instructions capable of being recognized by the system to control home electronics.

Therefore, dialogue type speech recognition services in which a user may more freely utter an instruction in a natural language and a system that may recognize the uttered natural language instruction and control home electronics are being developed. According to the dialogue type speech recognition services, the user does not need to previously know well a certain instruction and instead utters a word capable of being generally recognized, thereby easily controlling home electronics.

As a conventional dialogue type speech recognition service model, U.S. Pat. No. 6,604,090 and U.S. Patent Application No. 2002/0133347 disclose service models in which a keyword list is made by extracting a keyword from utterance contents of a user, a template corresponding to the keyword is extracted from a database, and a response is determined by comparing the templates with each other.

Also, U.S. Pat. Nos. 6,246,981 and 6,786,651 disclose service models in which expected dialogue forms are previously recorded and a response is provided according to a predetermined scenario corresponding to utterance contents of a user for each category, thereby recognizing an intention of the user.

However, in the aforementioned conventional dialogue type speech recognition services, since a natural language instruction uttered by a user is recognized by referring to standardized words previously inputted, there is a restriction on natural language analysis whose target is similar to a literary style or limited sentence combination. Specifically, in most natural language sentences uttered by the user, a word or phrase is omitted, tenses are not consistent and/or an order is inversed. Accordingly, a meaning itself may be ambiguous, and the natural language constructed by the imperfect sentence cannot be precisely recognized by the conventional services.

Also, when analyzing the intention of the user according to a certain scenario, it is not possible to correspond to general dialogue environments in which the intention of the user is frequently changed and cannot be estimated according to circumstances.

Accordingly, development of a dialogue type speech recognition service model capable of inducing a more intelligent and natural dialogue by more precisely analyzing and responding to imperfect sentence contents of a natural language instruction uttered by the user is required.

BRIEF SUMMARY

An aspect of the present invention provides a speech dialogue service apparatus and method, in which utterance contents of a user, including a natural language, are analyzed by recognizing a semantic slot, thereby more precisely recognizing the utterance contents of the user regardless of a type of utterance of the user.

An aspect of the present invention also provides a speech dialogue service apparatus and method, in which utterance contents of a user are analyzed by managing a dynamic context, thereby more precisely analyzing an intention of the user regardless of the user.

An aspect of the present invention also provides a speech dialogue service apparatus and method, in which utterance contents of a user is precisely recognized by recognizing a semantic slot and managing a context, thereby always precisely recognizing an intention of the user and performing a corresponding service even when a word of a predetermined natural language is instantly uttered as soon as the word comes to mind, without having to remember an utterance type capable of being recognized by each individual system.

According to an aspect of the present invention, there is provided a speech dialogue service apparatus including: a language analysis module tagging a part of speech (POS) of each respective word included in a sentence recorded in a predetermined text, syntactically analyzing the sentence by classifying a meaning of each respective word, and generating at least one semantic frame corresponding to the sentence according to a result of the syntactical analysis; and a dialogue management module analyzing an intention of the sentence corresponding to each at least one semantic frame, and generating a system response corresponding to the sentence intention by selecting a predetermined sentence intention according to whether an action corresponding to the intention of the respective sentence can be performed.

According to another aspect of the present invention, there is provided a speech dialogue service method including: tagging a POS of each respective word included in a sentence recorded in a predetermined text; syntactically analyzing the sentence by classifying a meaning of each respective word; generating at least one semantic frame corresponding to the sentence according to a result of the syntactical analysis; analyzing an intention of the sentence corresponding to each respective semantic frame; selecting a predetermined sentence intention according to whether an action corresponding to the intention of the sentence can be performed; and generating a system response corresponding to the sentence intention.

According to another aspect of the present invention, there is provided a method of providing a speech dialogue service, including: recognizing and converting uttered speech into text; resolving an intention of the speech by analyzing a sentence in the text by tagging a part of speech (POS) of each word of the sentence, parsing the sentence into at least one phrase by classifying a meaning of each word and combining each word whose meaning is classified, generating at least one semantic frame corresponding to the sentence according to the meaning of each word in the sentence, determining an intention of the sentence corresponding to the at least one semantic frame, and generating a system response corresponding to the sentence intention by selecting a predetermined sentence intention according to whether an action corresponding to the determined intention can be executed; analyzing the intention and performing plan management with respect to the execution of the user's intended command according to the intention analysis, when analysis of the intention is completed; and inquiring about the intention of the speech when the intention is not correctly analyzed or when the determined intention cannot be executed.

According to other aspects of the present invention, there are provided computer-readable recording media in which programs for executing the aforementioned methods are recorded.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
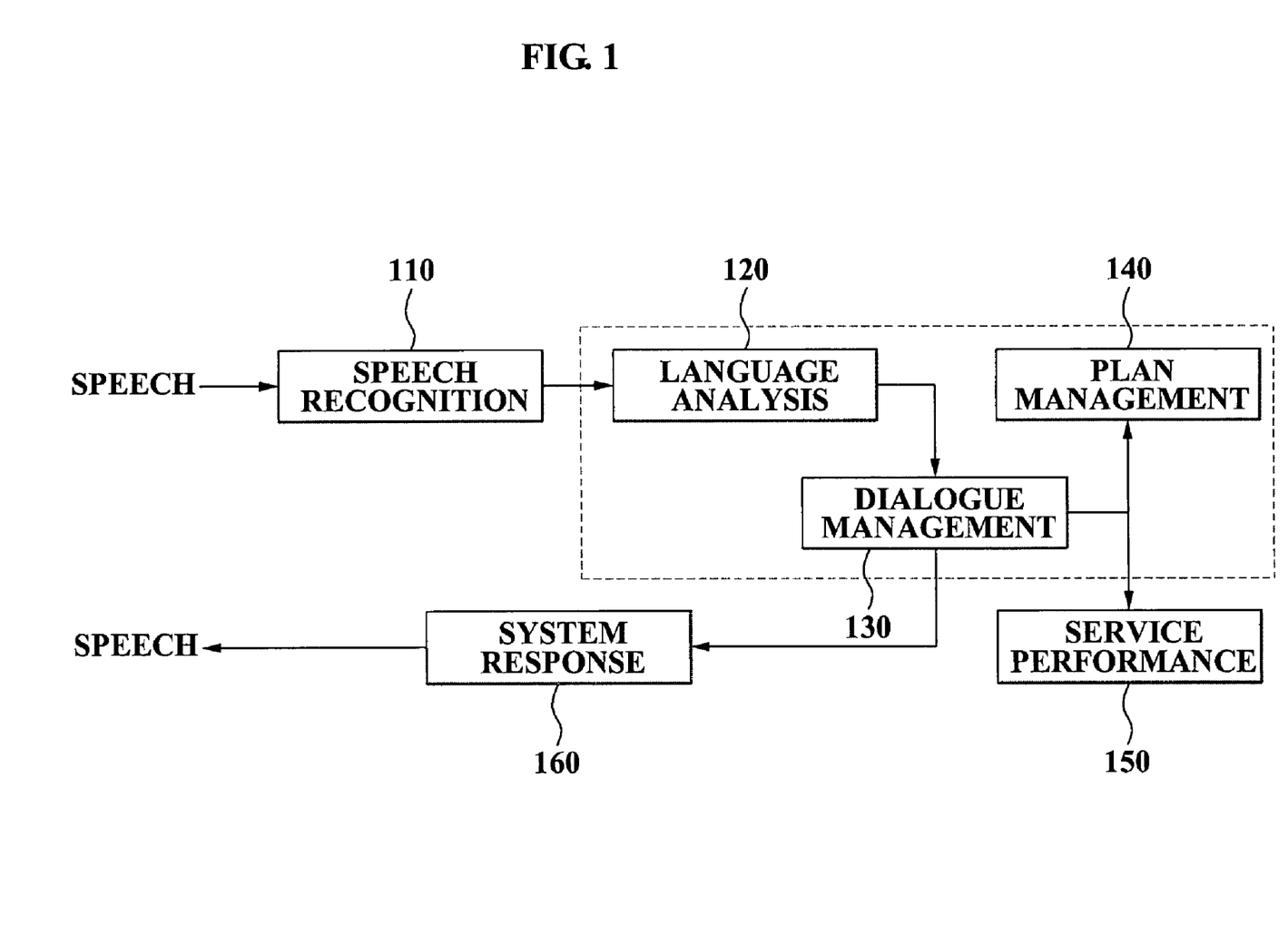
FIG. 1 is a block diagram illustrating a speech dialogue service method of a speech dialogue service system according to an embodiment of the present invention.

In the present description, an entire configuration and a flow of operations of a speech dialogue service system according to an embodiment of the present invention will be briefly described by referring to FIG. 1. The speech dialogue service apparatus and method according to an embodiment of the present invention will then be described in detail by referring to FIGS. 2 through 6.

FIG. 1 is a block diagram illustrating a speech dialogue service method of a speech dialogue service system according to an embodiment of the present invention.

Referring to FIG. 1, the speech dialogue service system recognizes an utterance by a user. Uttered contents of the user may be formed of a natural language. Specifically, the uttered contents may be formed of a certain language previously stored in the speech dialogue service system as well as words instantly uttered as soon as the words come to his or her mind.

The uttered contents formed of the natural language may have ambiguity. In the case of natural language, grammatical constraints are fewer than in an artificial language, such as a programming language of a computer, and an area of use is not restricted. Accordingly, the natural language has ambiguity in which clauses and syntaxes forming a sentence are analyzed as at least one part of speech (POS), syntax structure, or meaning, according to a context.

The ambiguity of the natural language is a phenomenon that sometimes requires that elements forming the natural language, such as clauses, sentences, or syntax structure, be analyzed more than once. The ambiguity of the natural language may be divided into lexical ambiguity, syntactic ambiguity, and semantic ambiguity.

The lexical ambiguity is an ambiguity in which a word or clause used in a sentence may be analyzed as more than one POS or morpheme. The syntactic ambiguity is an ambiguity in which one grammar structure may be analyzed more than once. The semantic ambiguity is an ambiguity in which a meaning of a word or clause may be analyzed more than once.

The speech dialogue service system recognizes and converts speech uttered by the user into text (110). A word or a sentence of the speech uttered by the user is analyzed using the text to determine the user's intention (i.e., intended command) (120). When the analysis of the word or sentence is completed, the speech dialogue service system performs dialogue management by analyzing an intention of the user according to the uttered content (130). When analysis of the user's intention is completed, the speech dialogue service system performs plan management with respect to the execution of the user's intended command (service performance) according to the intention analysis (140). Each service may be performed according to the plan management (150). Also, when it is determined that the intention of the user is not correctly analyzed in the dialogue management operation (130), a system response inquiring about the user's intention is made (160).

Figure 2:
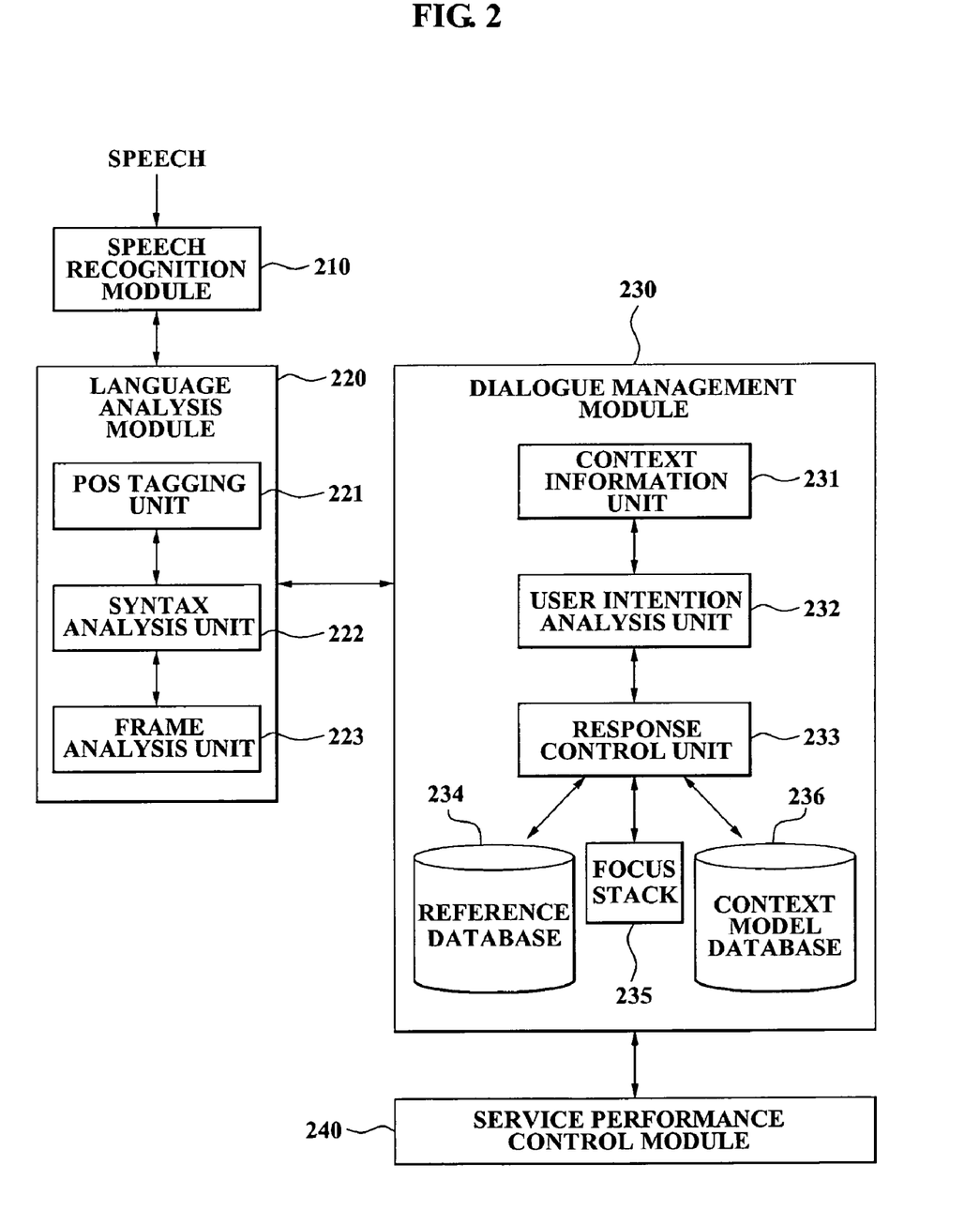
FIG. 2 is a block diagram illustrating a configuration of a speech dialogue service apparatus according to an embodiment of the present invention.

FIG. 2 is a block diagram illustrating a configuration of a speech dialogue service apparatus according to an embodiment of the present invention.

Referring to FIG. 2, the speech dialogue service apparatus includes a speech recognition module 210, a language analysis module 220, a dialogue management module 230, and a service performance control module 240.

The speech recognition module 210 recognizes and converts speech uttered by a user into a text. The speech recognition module 210 may be a general speech recognition apparatus capable of recognizing and converting the speech of the user into a predetermined text.

The language analysis module 220 may include a POS tagging unit 221, a syntax analysis unit 222, and a frame analysis unit 223. The language analysis module 220 may tag a POS to each word included in a sentence recorded in the text, may parse the sentence by classifying a meaning of the each word, and may generate at least one semantic frame corresponding to the sentence according to a result of the parsing.

The POS tagging unit 221 tags a POS of each word included in the sentence by analyzing a morpheme of the sentence. POS tagging is process of assigning accurate POS information to the each word according to a context in which the each word is used in the sentence. The POS tagging may be generally used as a preprocessing process for reducing excessive loads in the operation of parsing due to the lexical ambiguity.

Non-limiting examples of POS tagging methods include a rule-based POS tagging method and a statistic-based POS tagging method, both generally used in a natural language processing field.

In the statistic-based POS tagging method, the lexical ambiguity is stochastically solved by using probability or uncertainty obtained by analyzing a large amount of raw or tagged corpuses including examples of real-life natural language and attached information, and extracting statistic information with respect to the natural language.

Conversely, in the rule-based POS tagging method, a common theory or a determinate rule applied to the POS tagging is detected and the lexical ambiguity is determinately solved by using the detected common theory or determinate rule. The POS tagging unit 221 may tag the POS by a method including the rule-based POS tagging method, the statistic-based POS tagging method, and various other known kinds of POS tagging methods.

The syntax analysis unit 222 classifies each word for each meaning and parses the sentence into at least one phrase. The syntax analysis unit 222 may tag a basic meaning corresponding to the each word by classifying the meaning of the word to which a POS is tagged. The syntax analysis may classify the meaning of the word by referring to a predetermined word sense database (not shown) in which a general meaning of a word is recorded.

The syntax analysis unit 222 may parse the sentence into at least one phrase by combining each word whose meaning is classified. Specifically, the every word may be combined with each other by using the POS or the meaning tagged to the each word. For example, when the sentence is "Change television channel into No. 11", words included in the sentence may be "change", "television", "channel", "into", "No.", and "11". In this case, the syntax analysis unit 222 may combine the word performing the same role with each other by using a POS tagged to the word or meaning classification and may parse the sentence into phrases as "change", "television", "channel", "into No. 11".

The frame analysis unit 223 classifies the phrases into a theme, a parameter, and an action and generates at least one semantic frame corresponding to the sentence. When the phrases are parsed by the syntax analysis unit 222, the frame analysis unit 223 establishes a semantic slot corresponding to the respective phrase and substitutes the semantic slot for the respective phrase, thereby generating a semantic frame corresponding to the sentence. The semantic slot may be established as a theme slot, a parameter slot, and an action slot. Examples of the semantic slot will be described by referring to FIG. 3.

Figure 3:
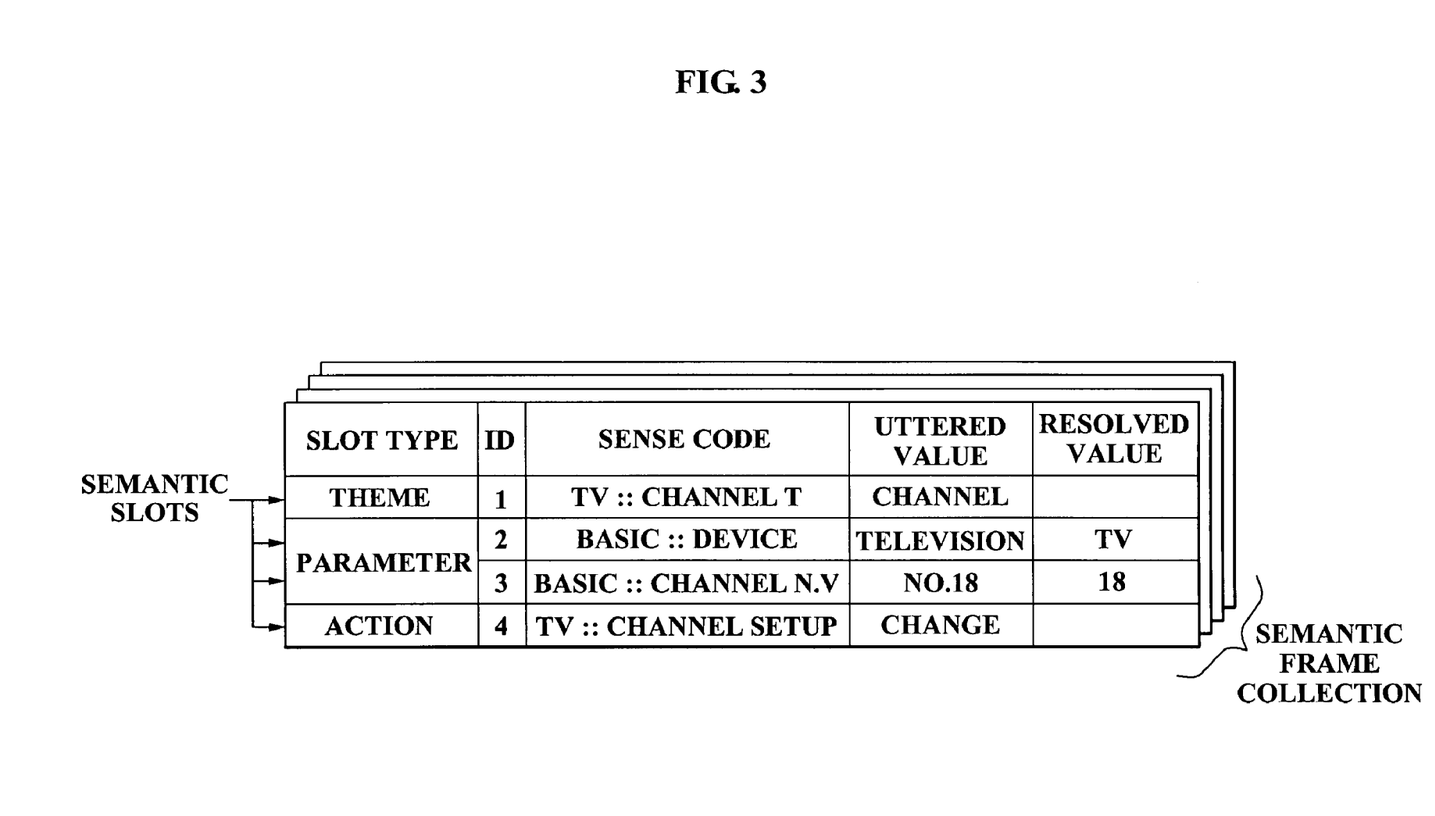
FIG. 3 is a diagram illustrating an example of a semantic frame according to an embodiment of the present invention.

FIG. 3 is a diagram illustrating an example of a semantic frame according to an embodiment of the present invention.

As shown in FIG. 3, a semantic frame according to an embodiment of the present invention may include a theme slot, a parameter slot, and an action slot. Also, a sense code, an uttered value, and a resolved value may be established, respectively, corresponding to each slot.

For example, when a user utters a sentence such as "Change television channel No. 18", the sentence may be parsed into "change", "television", "channel", and "No. 18" by the syntax analysis unit 222. The frame analysis unit 223 determines a type of slot to which a respective phrase is applied. Specifically, "television" and "No. 18" may be applied to the parameter slot, "channel" may be applied to the theme slot, and "change" may be applied to the action slot.

When the respective phrase is applied to a respective semantic slot as described above, the frame analysis unit 223 may analyze again the respective phrase. Specifically, "television" applied to the parameter may be analyzed again as "TV", and "No. 18" applied to the parameter slot may be analyzed again as "18". As described above, the frame analysis unit 223 may generate a semantic frame by analyzing again the respective phrase as a kind of domain-dependent language capable of being recognized by a system.

Also, the frame analysis unit 223 may generate a plurality of semantic frames in response to one sentence. Specifically, the plurality of semantic frames may be generated by differentiating a semantic slot applied to a respective phrase.

To generate the semantic frame as described above, the frame analysis unit 223 may maintain at least one semantic frame where a sense code is previously established in various methods, with respect to each of at least one control target device such as a TV, a refrigerator, a robot, an air conditioner, and a video player.

Referring back to FIG. 2, the dialogue management module 230 may include a context information unit 231, a user intention analysis unit 232, a response control unit 233, a reference database 234, a focus stack 235, and a context model database 236.

The dialogue management module 230 may analyze an intention of the sentence (i.e., an intended meaning) corresponding to each semantic form, may select a predetermined sentence intention according whether an action corresponding to each of the sentence intention can be performed, and may generate a system response corresponding to the sentence intention.

The context information unit 231 converts a respective phrase of the semantic form into a valid phrase or a default value by referring to the reference database 234. For this, the reference database 234 may include reference tables in which one of the theme, the parameter, and the action is established as a reference domain and at least one valid phrase or default value corresponding to domains in addition to the reference domain established with respect to a predetermined phrase is recorded. An example of the reference table will be described by referring to FIGS. 4 and 5.

Figure 4:
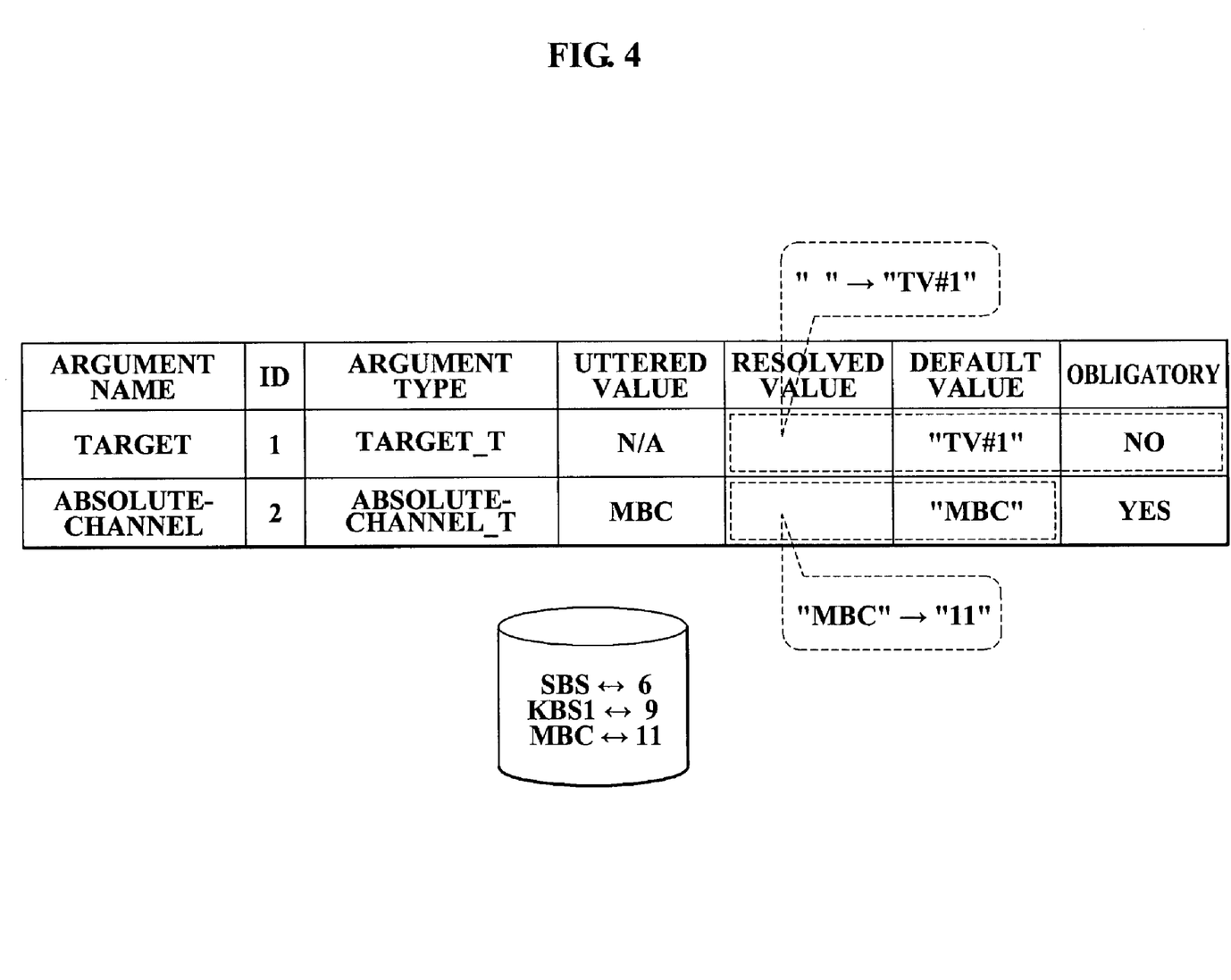
FIG. 4 is a diagram illustrating an example of a reference table in which a domain action is established as "channel change" according to an embodiment of the present invention.

FIG. 4 is a diagram illustrating an example of a reference table in which a domain action is established as "channel change" according to an embodiment of the present invention.

In FIG. 4, the reference table according to a case in which contents of utterance of the user are associated with a "channel" setup is shown. Specifically, the table reference may be loaded when a phrase of a theme slot of a semantic frame is associated with "channel" and a phrase of an action slot is established as "Change" or "Turn". In this case, a domain action of the reference table may be established as "setchannel".

For example, when a sentence according to the contents of the utterance of the user is "Turn to MBC", a reference table whose domain action is "setChannel" may be loaded as described above. In the reference table, "MBC" of the sentence may be recognized as MBC as it is or may be recognized as absolute-channel information of 11.

Also, the sentence does not include a target. Specifically, information with respect to the target whose channel has to be turned to MBC, specifically, a channel of which of a plurality of TVs has to be changed, is omitted. In this case, as shown in the reference table of FIG. 4, the context information unit 231 may establish the TV information as "TV#1" that is a default value.

Figure 5:
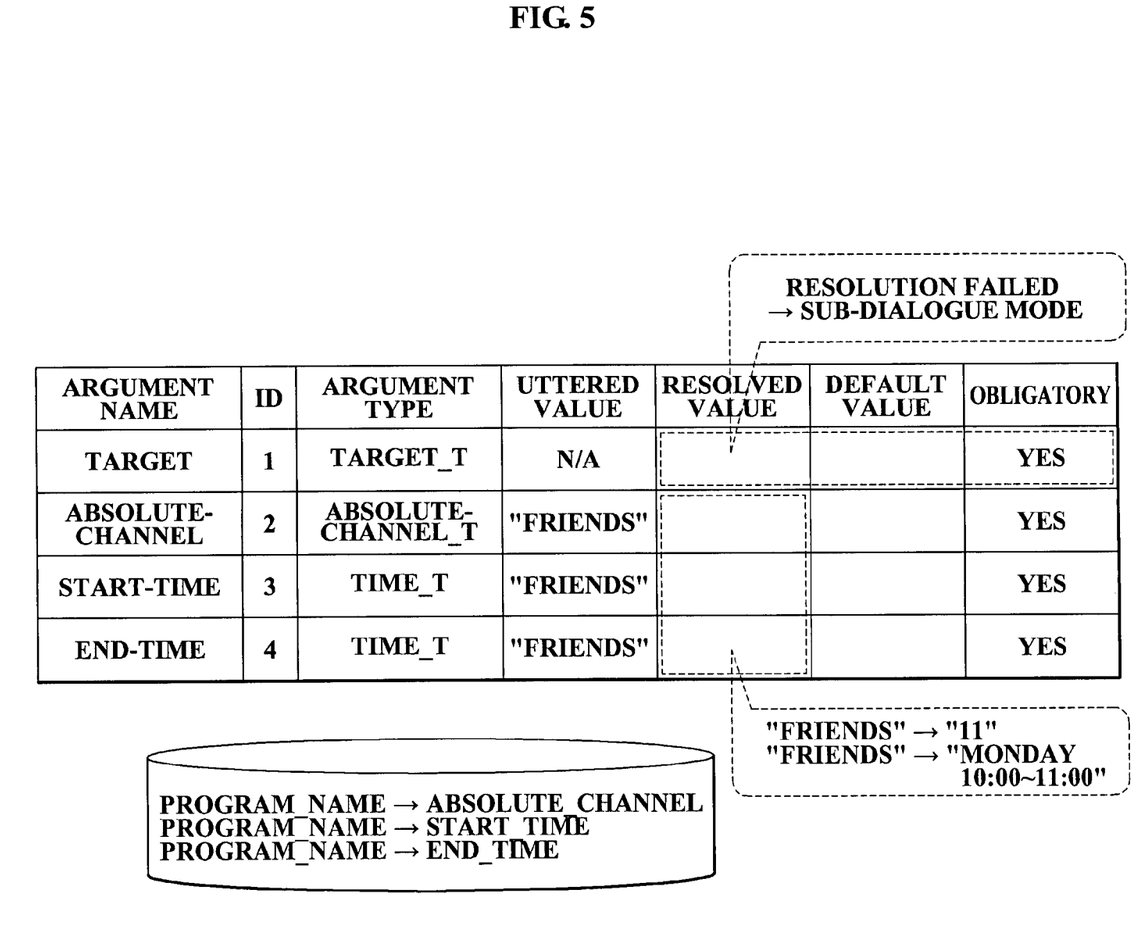
FIG. 5 is a diagram illustrating an example of a reference table in which a domain action is established as "scheduled recording" according to an embodiment of the present invention.

FIG. 5 is a diagram illustrating an example of a reference table in which a domain action is established as "scheduled recording" according to an embodiment of the present invention.

For example, when a sentence according to contents of an utterance of the user is "record Friends", the context information unit 231 may load a reference table whose domain action is established as "setRecordBooking" from the reference database 234. In the reference table of FIG. 5, target information may be established as a default value as shown in FIG. 4, or may be established by an inquiry to the user.

The absolute-channel information may be received via a predetermined server. Specifically, the sentence does not include the absolute-channel information. Accordingly, the context information unit 231 may access the predetermined server providing TV program information and may receive and establish that absolute-channel information corresponding to "Friends" is 11 from the server, in the reference table.

Recording start-time information and recording end-time information may also be received from the server. The context information unit 231 may receive and establish that playing time of "Friends" is from Monday 10:00 to 11:00 from the server, in the reference table.

The server may be externally located or may be a predetermined memory device included in the speech dialogue service apparatus according to an embodiment of the present invention. For example, in the case of broadcast data, the speech dialogue service apparatus may receive various pieces of program information at any time from each broadcasting station to record and maintain in the memory device.

As described by referring to FIGS. 4 and 5, the context information unit 231 analyzes the sentence by applying a respective phrase of the sentence to the reference table, thereby converting the respective phrase of the sentence into a valid phrase capable of being easily analyzed, or a default value.

Also, the context information unit 231 may analogize a phrase determined as being omitted from the sentence by referring to previous utterance contents, and may restore the sentence. The previous utterance contents of the user may be recorded and maintained in the focus stack 235. In the focus stack 235, as the reference table, the previous utterance contents of the user may be recorded according to a domain action or a type of argument. Also, the context information unit 231 may analogize an omitted argument value of the sentence from a value most currently recorded in the focus stack 235. In this way, omitted phrases can be deduced and used to resolve the user's intention.

As described above, the context information unit 231 may restore the sentence by referring to the reference database 234 and the focus stack 235. In this case, after the sentence is restored, when a phrase whose meaning is ambiguous is included, or an omitted value exists in the sentence, the response control unit 233 may make an inquiry of the user with respect to the ambiguous phrase or the omitted value. The inquiry may be a dialog.

Referring back to FIG. 2, the user intention analysis unit 232 generates at least one action list by analyzing an intention of the user according to the restored sentence and selects a predetermined action by determining whether a respective action can be performed. The user intention analysis unit 232 may analyze the intention of the user according to the sentence by referring to the context model database 236.

In the context model database 236, arguments corresponding to at least one phrase and a sub-dialogue that is a combination of the arguments according to the previous utterance contents of the user are recorded and maintained.

In this case, the user intention analysis unit 232 may extract the arguments corresponding to the respective phrase included in the sentence by referring to the context model database 236 and may analyze the intention of the user according to the sentence by referring to the sub-dialogue associated with the extracted arguments.

For example, when the sentence is "deliver a voice message", the user intention analysis unit 232 may generate a sub-dialogue of a domain action, such as "deliverVoiceMessage" corresponding to "deliver" by referring to the context model database 236.

Accordingly, the user intention analysis unit 232 may analyze the intention of the user via the sub-dialogue, as in the reference table. In this case, recognizing that an opponent is omitted from the sub-dialogue, the user intention analysis unit 232 may inquire of the user about the opponent via the response control unit 233 and may establish the opponent from a response of the user.

Also, when the sub-dialogue associated with the established argument does not exist in the context model database 236, the user intention analysis unit 232 may generate and record the sub-dialogue corresponding to the argument in the context model database 236.

Also, the user intention analysis unit 232 may analyze the intention of the user more than once. Specifically, more than one intention of the user may be established according to a method of combining the arguments, and the ambiguity of meaning due to an omitted phrase. For example, when the utterance contents of the user is "TV", the user intention analysis unit 232 may establish the intentions of the user according to a case of "turn on TV" and a case of "turn off TV", respectively.

The user intention analysis unit 232 generates an action list corresponding to the at least one intention of the user. The user intention analysis unit 232 selects a predetermined action by determining whether a respective action can be performed. For example, the user intention analysis unit 232 may generate an action list including an action of "turn on TV" and an action of "turn off TV". The user intention analysis unit 232 reads whether the TV is currently turned on or off. As a result of the reading, when the TV is turned on, the user intention analysis unit 232 may select the action of "turn off TV". Of course, in this case, the user intention analysis unit 232 may make an inquiry to the user with respect to whether to turn the TV on or off.

As described above, when an action according to the intention of the user is selected by the user intention analysis unit 232, to perform a service according to the selected action, the service performance control module 240 may control a predetermined device for providing the service.

As described above, the speech dialogue service apparatus according to an embodiment of the present invention may analyze a dialogue of the user via analyzing a semantic slot and may recognize an intention of the user via managing a dynamic context. Accordingly, regardless of various types of utterance of the user, the intention of the user according to contents uttered by the user may be more precisely recognized. Also, there is no need to remember a type of utterance capable of being recognized by each individual system. Services may be provided to the user just by instantly uttering a desired dialog. Also, the utterance of the user may be processed, and an intelligent and dynamic speech dialogue service may be provided by a sub-dialogue.

Figure 6:
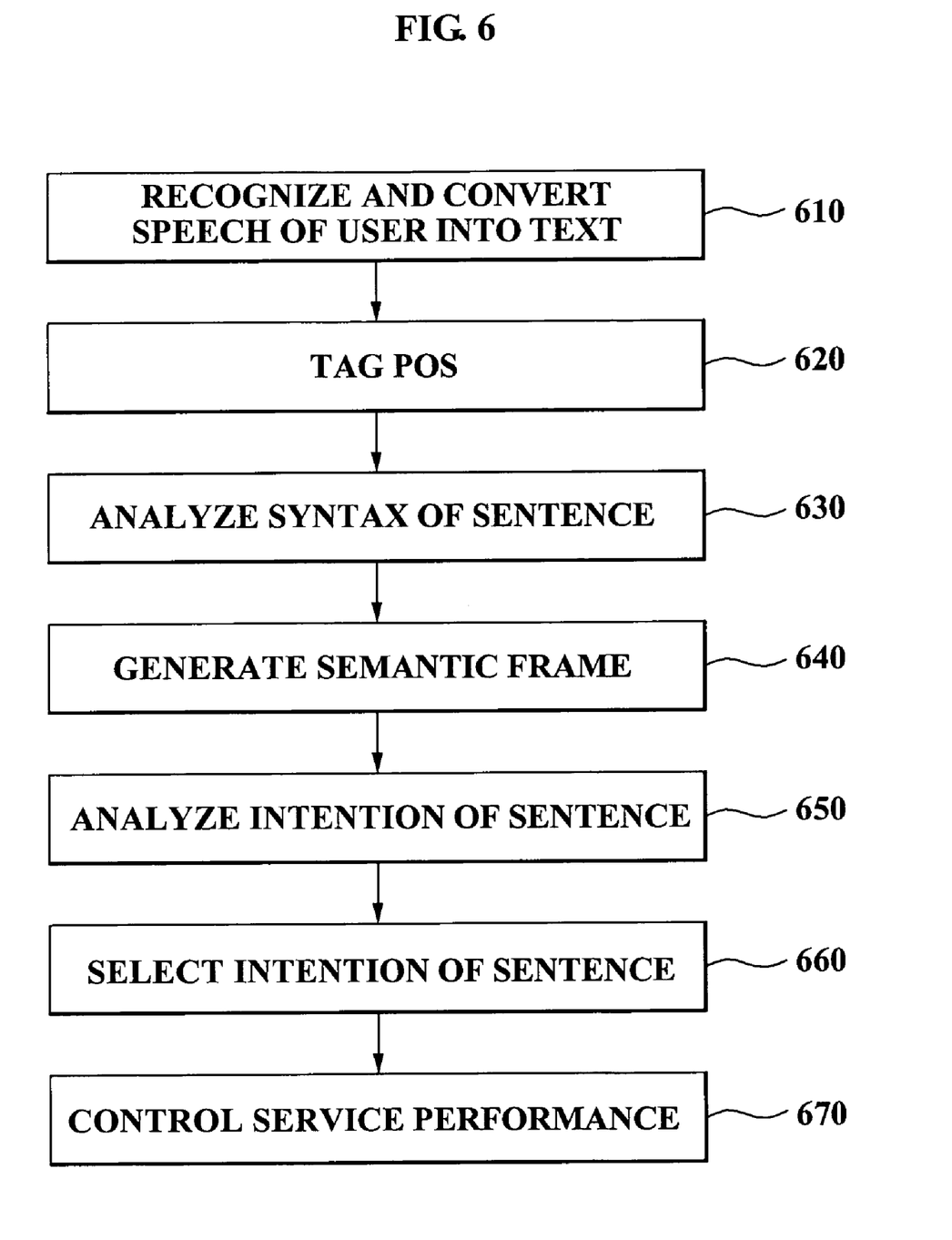
FIG. 6 is a flowchart illustrating the speech dialogue service method according to an embodiment of the present invention.

FIG. 6 is a flowchart illustrating a speech dialogue service method according to an embodiment of the present invention.

The speech dialogue service apparatus recognizes and converts a speech uttered by a user into text (610). The speech dialogue service apparatus tags a POS of each respective word included in a sentence recorded in the text (620). The speech dialogue service apparatus analyzes a syntax of the sentence by classifying a meaning of each respective word (630).

The speech dialogue service apparatus generates at least one semantic frame corresponding to the sentence according to a result of the syntax analyzing (640). The speech dialogue service apparatus analyzes an intention of the sentence corresponding to each respective semantic form (650) and selects a predetermined sentence intention according to whether an action corresponding to each respective sentence intention can be performed (660). The speech dialogue service apparatus controls a predetermined device to perform a service according to the selected sentence intention (670). Also, the speech dialogue service apparatus may generate and provide a predetermined system response corresponding to the sentence intention to the user. The system response may include an inquiry to the user, caused by lexical ambiguity or impossibility of service performance.

The speech dialogue service method of FIG. 6 may be implemented by including all the operations of the various components of the speech dialogue service apparatus described by referring to FIGS. 2 through 5.

The speech dialogue service method according to the present invention may be implemented as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter.

The above-described embodiments of the present invention provide a speech dialogue service apparatus and method, in which utterance contents of a user, including a natural language, are analyzed by recognizing a semantic slot, thereby more precisely recognizing the utterance contents of the user regardless of a type of utterance of the user.

The above-described embodiments of the present invention also provide a speech dialogue service apparatus and method, in which utterance contents of a user are analyzed by managing a dynamic context, thereby more precisely analyzing an intention of the user regardless of the user.

The above-described embodiments of the present invention also provide a speech dialogue service apparatus and method, in which utterance contents of a user is precisely recognized by recognizing a semantic slot and managing a context, thereby always precisely recognizing an intention of the user and performing a corresponding service even when a word of a predetermined natural language is instantly uttered as soon as the word comes to mind, without having to remember an utterance type capable of being recognized by each individual system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A speech dialogue service apparatus, comprising at least one processing device, the apparatus comprising:

a language analysis unit comprising the at least one processing device tagging a part of speech (POS) of each respective word included in a sentence recorded in a predetermined text, syntactically analyzing the sentence by classifying a meaning of each respective word, and generating at least one semantic frame corresponding to the sentence according to a result of the syntactical analysis; and a dialogue management unit analyzing an intention of the sentence corresponding to each at least one semantic frame, and generating a system response corresponding to the sentence intention by selecting a predetermined sentence intention according to whether an action corresponding to the intention of the respective sentence can be performed, wherein the language analysis unit comprises:

a POS tagging unit analyzing a morpheme of the sentence and tagging the POS of each respective word;

a syntax analysis unit classifying each respective word for each meaning and parsing the sentence into at least one phrase; and a frame analysis unit classifying each respective phrase into a theme, a parameter, and an action, and generating at least one semantic frame corresponding to the sentence, wherein the dialogue management unit comprises:

a context information unit restoring the sentence by converting a respective phrase of the at least one semantic frame into a valid phrase or a default value, by analogizing a phrase determined to be omitted from the sentence with reference to previous utterance contents of a user; and a user intention analysis unit generating at least one action list by analyzing an intention of the user according to the restored sentence and selecting a predetermined action by determining whether a respective action can be performed.

2. The apparatus of claim 1, further comprising a speech recognition unit recognizing an utterance of a user and converting speech of the utterance into a text, wherein the text comprises at least one natural language uttered by the user.

3. The apparatus of claim 1, wherein the database comprises:

a reference database maintaining a reference table in which one of the theme, the parameter, and the action is established as a reference domain and at least one valid phrase or default value corresponding to other domains in addition to the reference domain established with respect to a predetermined phrase is recorded; and a focus stack in which a result of analyzing previous utterance contents in response to at least one user is recorded.

4. The apparatus of claim 1, wherein the dialogue management unit further comprises a response control unit providing a dialog including inquiry content with respect to the phrase or the phrase determined to be omitted to the user when the context information unit cannot convert the phrase included in the sentence into the valid phrase or the default value, or cannot analogize the phrase determined to be omitted from the sentence.

5. The apparatus of claim 1, further comprising a context model database storing arguments corresponding to at least one phrase, and a sub-dialogue that is a combination of the arguments according to the previous utterance contents of the user in response to a respective user, wherein the user intention analysis unit extracts the argument corresponding to the respective phrase included in the sentence with reference to the context model database and analyzes the intention of the user according to the sentence with reference to the sub-dialogue associated with the extracted argument.

6. The apparatus of claim 5, wherein the user intention analysis unit generates and records the sub-dialogue corresponding to the extracted argument in the context model database when the sub-dialogue associated with the extracted argument does not exist in the context model database.

7. The apparatus of claim 1, wherein the user intention analysis unit checks a present state of a device that will perform an action corresponding to the action list and determines whether the action can be performed.

8. A method for a speech dialogue service comprising:
analyzing a morpheme of a sentence;
tagging a POS of each respective word included in the sentence recorded in a predetermined text;
classifying a meaning of each respective word;
parsing the sentence into at least one respective phrase;
using at least one processing device classifying each respective phrase into a theme, a parameter, and an action;
generating at least one semantic frame corresponding to the sentence;
restoring, using at least one processing device, the sentence by converting a respective phrase of the at least one semantic frame into a valid phrase or a default value, by analogizing a phrase determined to be omitted from the sentence with reference to previous utterance contents of a user;
analyzing an intention of the user according to the restored sentence;
generating at least one action list according to the intention of the user;
determining whether the generated action can be performed; and
generating a system response corresponding to the action being determined to be able to be performed.

9. A computer-readable recording medium including a computer-executable program to control at least one processing device to execute a speech dialogue service method, the method comprising:
analyzing a morpheme of a sentence;
tagging a POS of each respective word included in a the sentence recorded in a predetermined text;
classifying a meaning of each respective word;
parsing the sentence into at least one respective phrase;
classifying each respective phrase into a theme, a parameter, and an action;
generating at least one semantic frame corresponding to the sentence;
restoring the sentence by converting a respective phrase of the at least one semantic frame into a valid phrase or a default value, by analogizing a phrase determined to be omitted from the sentence with reference to previous utterance contents of a user;
analyzing an intention of the user according to the restored sentence;
generating at least one action list according to the intention of the user;
determining whether the generated action can be performed; and
generating a system response corresponding to the action being determined to be able to be performed.

* * * * *

UNITED STATES PATENT AND TRADEMARK OFFICE
CERTIFICATE OF CORRECTION

PATENT NO. : 7,734,461 B2  Page 1 of 1
APPLICATION NO. : 11/510728
DATED : June 8, 2010
INVENTOR(S) : Byung Kwan Kwak et al.

It is certified that error appears in the above-identified patent and that said Letters Patent is hereby corrected as shown below:

Column 10, Line 62, delete "value," and insert -- value --, therefor.

Column 12, Line 10, delete "value," and insert -- value --, therefor.

Column 12, Line 28 (Approx.), before "the" delete "a".

Column 12, Line 38, delete "value," and insert -- value --, therefor.

Signed and Sealed this

Second Day of November, 2010

David J. Kappos
*Director of the United States Patent and Trademark Office*